United States Patent [19]

Jansen et al.

[11] Patent Number: 4,853,450

[45] Date of Patent: Aug. 1, 1989

[54] TERPOLYMER LATICES

[75] Inventors: Ulrich Jansen, Dormagen; Karl-Heinz Ott, Leverkusen, both of Fed. Rep. of Germany

[73] Assignee: Bayer Aktiengesellschaft, Leverkusen, Fed. Rep. of Germany

[21] Appl. No.: 309,146

[22] Filed: Feb. 13, 1989

[30] Foreign Application Priority Data

Feb. 26, 1988 [DE] Fed. Rep. of Germany ....... 3806075

[51] Int. Cl.$^4$ ...................... C08F 20/60; C08F 120/60
[52] U.S. Cl. ................... 526/303.1; 524/543; 524/555; 524/565; 524/579; 526/307; 526/307.8
[58] Field of Search ................ 526/303.1, 307, 307.8; 524/543, 565, 555, 579

[56] References Cited

U.S. PATENT DOCUMENTS

| | | | |
|---|---|---|---|
| 3,010,936 | 11/1961 | Irvin | 526/86 |
| 4,289,667 | 9/1981 | Bush | 526/74 |
| 4,294,740 | 10/1981 | Mizuguchi et al. | 526/201 |
| 4,361,684 | 11/1982 | Minematsu et al. | 526/87 |
| 4,448,945 | 5/1984 | Fink et al. | 526/320 |
| 4,526,928 | 7/1985 | Mathumoto et al. | 526/80 |
| 4,535,137 | 8/1985 | Siol et al. | 526/216 |
| 4,659,790 | 4/1987 | Shimoyato et al. | 526/87 |
| 4,737,543 | 4/1988 | Hendricks et al. | 526/216 |
| 4,771,098 | 9/1988 | Siol et al. | 526/200 |

*Primary Examiner*—Morton Foelak
*Attorney, Agent, or Firm*—Connolly and Hutz

[57] ABSTRACT

The invention relates to a latex of an α-methylstyrene/acrylonitrile/methacrylamide terpolyer which shows excellent stability to stirring.

8 Claims, No Drawings

TERPOLYMER LATICES

This invention relates to a latex of an α-methylstyrene/acrylonitrile/methacrylamide terpolymer which shows excellent stability to stirring.

Heat-resistant α-methylstyrene/acrylonitrile (AMS/ACN) copolymers have already been produced by emulsion polymerization to form a latex, followed by coagulation (cf U.S. Pat. No. 3,010,936, EP-A-No. 42 572, U.S. Pat. No. 4,659,790).

Certain copolymers of α-methylstyrene (AMS), acrylonitrile (ACN) and methacrylamide (MAA) have been produced by solution polymerization (Chem. pap. 41 (1), 119–124 (1987)). Production on a commercial scale is not possible by this method.

However, known processes for the production of α-methylstyrene polymer latices only give latices showing poor stability to shearing, so that they are difficult to produce economically and to handle.

The present invention relates to an α-methylstyrene/acrylonitrile/methacrylamide terpolymer latex showing improved polymer latex stability without large amounts of polymerization auxiliaries (which generally have an adverse effect on the quality of the molding compounds produced from the polymer latex).

It has been found that thermoplastic molding compounds based on a terpolymer of α-methylstyrene, acrylonitrile and methacrylamide have a high heat distortion temperature and good thermal stability at high processing temperatures. In the production of these terpolymers by emulsion polymerization, polymer latices are formed which show distinctly improved stability to mechanical shearing compared wit conventional copolymer and terpolymer latices containing α-methylstyrene and acrylonitrile in copolymerized form.

This is of particular advantage because it is possible to produce highly heat-resistant AMS polymer latices which have a distinctly higher polymer content so that the copolymer can also be produced more economically by improvement of the volume/time yield.

It ist also possible in accordance with the invention to produce stable AMS copolymer latices using distinctly smaller quantities of polymerization auxiliaries, for example emulsifier, without their latex-stability becoming too low.

Accordingly, the present invention relates to a latex of a thermoplastic terpolymer produced by emulsion polymerization of

A.1

50 to 85 parts by weight, preferably 62 to 85 parts by weight and more preferably 69 to 85 parts by weight α-methylstyrene;

A.2

10 to 50 parts by weight, preferably 14 to 37 parts by weight and more preferably 14 to 30 parts by weight acrylonitrile and/or methacrylonitrile and

A.3

1 to 50 parts by weight, preferably 1 to 20 parts by weight and more preferably 1 to 10 parts by weight methacrylamide.

The terpolymer latex according to the present invention may be prepared by conventional emulsion polymerization technics. The polymerisation can be carried out by adding the copolymerisable monomers stepwise or preferably semi-continuously into the reactor. The polymerisation temperature is 50° to 90° C., preferably 65° to 80° C.

The emulsifiers used may be known, preferably anionic, surfactants, for example Na and K salts of disproportionated abietic acid or higher fatty acids and alkali salts of alkyl and alkylaryl sulfonic acids and alkylaryl carboxylic acids. Organic sulfates are also suitable. Nonionic emulsifiers, for example polyethylene oxide alkyl ethers, or combinations of several emulsifiers may also be used.

The initiators used may be water-soluble organic peroxides, azo compounds, alkali persulfates and perphosphates; at polymerization temperatures below 60° C., redox systems based on organic peroxides and water-soluble reducing agents are particularly suitable. Examples of initiators are potassium and ammonium persulfate and—as redox systems—cumene hydroperoxide/$Fe^{++}$/Rongalit; p-methane hydroperoxide/$Fe^{++}$/Rongalit; diisopropylbenzene hydroperoxides/$F^{++}$/ascorbic acid.

Organic sulfur compounds, such as mercaptans and disulfides, may be used to regulate the molecular weight of the polymers, long-chain mercaptans, for example n- and tert.-dodecyl mercaptan, being preferred. The regulators are best dissolved in the monomer mixture.

Emulsifiers, initiators and regulators may also be initially introduced in the aqueous solution or added continuously or non-continuously during polymerization.

On completion of polymerization, the copolymer latex obtained is coagulated in known manner (for example by addition of mineral acid and/or salt) and washed, optionally after mixing with other polymer latices and/or after addition of additives. The copolymer may be dried in vacuo at 110°–150° C. to form a powder although it is preferably dried by degassing of the polymer melt in an extruder.

To obtain molding compounds having a very high heat distortion temperature, the proportion of volatile constituents (water, residual monomers) has to be reduced to less than 4000 ppm and preferably to less than 2000 ppm.

In the following Examples and Comparison Examples, quantities are in parts by weight.

I Test Methods

Glass temperature (Tg) Thermomechanical analysis (TMA), instrument: Perkin-Elmer TMS-1, penetration mode, diameter of measuring probe 1 mm, pressure applied 0.2N, heating rate 5 k/min Measurement of latex shear stability A type T 45 Ultra-Turrax (Jahnke & Kunkel GmBH & Co. KG/IKA-Werke Staufen, West Germany) was used for evaluating the latex shear stability of component A.

A latex sample of terpolymer A was sheared by the rotating blade (10,000 r.p.m.) of the Ultra-Turrax at room temperature (and optionally at 75° C.) and at pH 9. The time taken for the first coagulation to be formed, clearly reflected in an increase in the power consumption of the Ultra-Turrax was measured.

Shear stability is adequate when the latex remains stable without coagulating for more than 30 seconds. In the case of shear-stable latices, the test was terminated after more than 60 seconds.

II Preparation of the Terpolymer Latex

Examples A-1 to A-5 and Comparison Examples A-I to A-IV

An emulsifier solution (see Table) was introduced into a 10 liter glass flask as starter 1 and was heated to 75° C. A monomer mixture of α-methylstyrene, acrylonitrile and copolymer (see Table) was added as starter 2 and emulsified for 10 minutes. A solution of 0.35 part potassium persulfate in 20 parts water was added at 75° C., followed by stirring for 1 hour. The monomer feeds 1 and 2 were then uniformly introduced over a period of 5 hours. On completion of the addition, the polymerization mixture was stirred for 2 hours, after which the polymer latex was analyzed and worked up.

To this end, the polymer latex was coagulated by addition of an aqueous solution containing 1% acetic acid and 1% magnesium sulfate at 98° C. The coagulate was washed and dried to a residual content of volatile constituents of less than 2000 ppm.

It can be seen from the Tables that the polymers according to the invention have high glass temperatures and that their production by emulsion polymerisation gives distinctly shear-stable polymer latices (cf. A-I to A-IV).

This applies in particular where polymerization is carried out in the presence of small quantities of emulsifier (A-3) or at high polymer solids contents (A-5).

TABLE

| Example | | (Examples) A-1 | A-2 | A-3 | A-4 | A-5 |
|---|---|---|---|---|---|---|
| Starter 1 | | | | | | |
| Deionized water | (parts) | 145 | 105 | 130 | 130 | 90 |
| Emulsifier I | (parts) | 2.5 | 2.5 | — | — | — |
| Emulsifier II | (parts) | — | — | 1.2 | 2.5 | 2.5 |
| Starter 2 | | | | | | |
| AMS | (parts) | 14 | 12 | 20 | 20 | 20 |
| ACN | (parts) | 5 | 4 | 5 | 5 | 5 |
| Methacrylamide | (parts) | 1 | 2 | 1 | 1 | 1 |
| Methylmethacrylate | (parts) | — | — | — | — | — |
| t-DDM* | (parts) | 0.05 | 0.05 | — | — | — |
| Monomer feed 1 | | | | | | |
| AMS | (parts) | 58 | 58 | 55 | 55 | 55 |
| ACN | (parts) | 21 | 16 | 18 | 18 | 18 |
| t-DDM* | (parts) | 0.1 | 0.1 | 0.05 | 0.05 | 0.05 |
| Monomer feed 2 | | | | | | |
| methacrylamide | (parts) | 1 | 8 | 1 | 1 | 1 |
| Deionized water | (parts) | 20 | 60 | 20 | 20 | 20 |
| Polymer solids content % | | 33.5 | 34 | 34 | 35 | 40 |
| Latex pH value | | 8.1 | 8.0 | 8.7 | 8.9 | 8.9 |
| Stability of latex to stirring | | | | | | |
| 20° C. (seconds) | | 60 | 50 | 60 | 60 | 52 |
| 75° C. | | 45 | | | | |
| (TMA, °C.) glass temperature | | 124 | 121 | 137 | 137 | 138 |

*t-DDM = tert.-dodecyl mercaptan
Emulsifier I alkali salt of a $C_{12}-C_{16}$ alkylsulfonate mixture
Emulsifier II Na salt of disproportionated abietic acid

TABLE

| Example | | (Comparison Examples) A-I | A-II | A-III | A-IV |
|---|---|---|---|---|---|
| Starter 1 | | | | | |
| Deionized water | (parts) | 165 | 165 | 165 | 165 |
| Emulsifier I | (parts) | 2.5 | — | — | 2.5 |
| Emulsifier II | (parts) | — | 1.0 | 2.5 | — |
| Starter 2 | | | | | |
| AMS | (parts) | 12 | 12 | 20 | 25 |
| ACN | (parts) | 6 | 6 | 6 | 4 |
| Methylacrylamide | (parts) | — | — | — | — |
| Methylmethacrylate | (parts) | — | — | — | 3 |
| t-DDM* | (parts) | 0.05 | 0.05 | 0.05 | 0.05 |
| Monomer feed 1 | | | | | |
| AMS | (parts) | 60 | 60 | 55 | 50 |
| ACN | (parts) | 22 | 22 | 19 | 18 |
| t-DDM* | (parts) | 0.1 | 0.1 | 0.05 | 0.05 |
| Monomer feed 2 | | | | | |
| Methacrylamide | (parts) | — | — | — | — |
| Deionized water | (parts) | — | — | — | — |
| Polymer solids content % | | 33 | 32 | 32 | 32 |
| Latex pH value | | 7.6 | 8.5 | 8.0 | 8.3 |
| Stability of latex to stirring | | | | | |
| 20° C. (seconds) | | 30 | 5 | 32 | 27 |
| 75° C. | | 2 | | | |
| (TMA, °C.) glass temperature | | 124 | 121 | 136 | 130 |

*t-DDM = tert.-dodecyl mercaptan
Emulsifier I alkali salt of a $C_{12}-C_{16}$ alkylsulfonate mixture
Emulsifier II Na salt of disproportionated abietic acid

We claim:

1. A shear-stable terpolymer latex prepared by emulsion polymerization of
   (a) 50 to 85 parts by weight of α-methylstyrene,
   (b) 10 to 50 parts by weight of acrylonitrile and/or methacrylonitrile, and
   (c) 1 to 50 parts by weight of methacrylamide.
2. A latex according to claim 1, prepared from
   )arts by weight of (a),
   14 to 37 parts by weight of (b), and
   1 to 20 parts by weight of (c).
3. A latex according to claim 1, prepared from
   69 to 85 parts by weight of (a),
   14 to 30 parts by weight of (b), and
   1 to 10 parts by weight of (c).
4. A moulding composition prepared from a latex according to claim 1.
5. A latex according to claim 2, prepared from
   69 to 85 parts by weight of (a),
   14 to 30 parts by weight of (b), and
   1 to 10 parts by weight of (c).
6. A moulding composition prepared from a latex according to claim 5.
7. A moulding composition prepared from a latex according to claim 2.
8. A moulding composition prepared from a latex according to claim 3.

* * * * *